(12) United States Patent
Frankel et al.

(10) Patent No.: US 7,283,978 B2
(45) Date of Patent: *Oct. 16, 2007

(54) METHOD AND APPARATUS FOR CREATING AND ADMINISTERING A PUBLICLY TRADED INTEREST IN A COMMODITY POOL

(75) Inventors: Oliver L. Frankel, New York, NY (US); Heather K. Shemilt, New York, NY (US); Daniel Feit, Bronx, NY (US); Thomas H. Glanfield, Jr., New York, NY (US); Michael J. Crinieri, Bronxville, NY (US)

(73) Assignee: Goldman Sachs & Co., New York, NY (US)

( * ) Notice: Subject to any disclaimer, the term of this patent is extended or adjusted under 35 U.S.C. 154(b) by 66 days.

This patent is subject to a terminal disclaimer.

(21) Appl. No.: 11/229,773

(22) Filed: Sep. 19, 2005

(65) Prior Publication Data

US 2006/0036533 A1    Feb. 16, 2006

Related U.S. Application Data

(63) Continuation-in-part of application No. 10/827,940, filed on Apr. 20, 2004.

(51) Int. Cl.
*G06Q 40/00* (2006.01)
(52) U.S. Cl. .............................. 705/35; 705/37
(58) Field of Classification Search ............ 705/35, 705/37
See application file for complete search history.

(56) References Cited

U.S. PATENT DOCUMENTS

| | | | |
|---|---|---|---|
| 5,262,942 A * | 11/1993 | Earle | 705/37 |
| 5,517,406 A * | 5/1996 | Harris et al. | 705/30 |
| 6,088,685 A * | 7/2000 | Kiron et al. | 705/36 R |
| 6,513,020 B1 * | 1/2003 | Weiss et al. | 705/36 R |
| 2001/0025266 A1 * | 9/2001 | Gastineau et al. | 705/36 |
| 2001/0042037 A1 * | 11/2001 | Kam et al. | 705/36 |
| 2002/0026399 A1 * | 2/2002 | Narayan et al. | 705/37 |
| 2002/0046154 A1 | 4/2002 | Pritchard | |
| 2002/0178102 A1 | 11/2002 | Scheinberg et al. | |

(Continued)

FOREIGN PATENT DOCUMENTS

WO    WO 02/19204 A1    3/2002

(Continued)

OTHER PUBLICATIONS

John Downes and Jordan Elliot Goodman, Dictionary of Finance and Investment Terms, p. 184 (Sixth Edition by Barron's Educational Series, Inc.).*

(Continued)

*Primary Examiner*—James P. Trammell
*Assistant Examiner*—James Rioux
(74) *Attorney, Agent, or Firm*—Buckley, Maschoff & Talwalkar LLC

(57) ABSTRACT

Systems, methods, apparatus, computer program code and means for creating and administering a publicly traded interest in a commodity pool include forming a commodity pool having a first position in a futures contract and a corresponding second position in a margin investment, and issuing equity interests of the commodity pool to third party investors.

12 Claims, 11 Drawing Sheets

U.S. PATENT DOCUMENTS

| | | | |
|---|---|---|---|
| 2002/0188539 A1* | 12/2002 | Axelrad et al. | 705/35 |
| 2002/0194099 A1* | 12/2002 | Weiss | 705/36 |
| 2002/0198808 A1* | 12/2002 | Myers | 705/35 |
| 2003/0009400 A2* | 1/2003 | Kiron et al. | 705/35 |
| 2003/0144947 A1 | 7/2003 | Payne | |
| 2003/0154153 A1* | 8/2003 | Steidlmayer et al. | 705/37 |
| 2003/0177077 A1 | 9/2003 | Norman | |
| 2003/0182219 A1* | 9/2003 | Bodurtha et al. | 705/36 |
| 2003/0229561 A1* | 12/2003 | Wallman | 705/36 |
| 2003/0233302 A1 | 12/2003 | Weber et al. | |
| 2004/0006528 A1* | 1/2004 | Kevin Fung | 705/37 |
| 2004/0044609 A1 | 3/2004 | Moore | |
| 2004/0049448 A1 | 3/2004 | Glickman | |
| 2004/0054613 A1* | 3/2004 | Dokken | 705/36 |
| 2005/0044035 A1* | 2/2005 | Scott | 705/37 |

FOREIGN PATENT DOCUMENTS

| | | | |
|---|---|---|---|
| WO | 2004/006057 | * | 1/2004 |
| WO | WO 2004/006057 A2 | | 1/2004 |

OTHER PUBLICATIONS

Richard E. Waldron, Futures 101: An Introduction to Commodity Trading, p. 150 (3rd Edition 1999 by Squantum Publishing Co.).*

Brad Zigler, Financial Planning, Securities Data Publishing, Jun. 1, 2004 (Dialog No. 04611087).*

Sarah O'Brien, Backlog to the Futures, Aug. 13, 2001, Investment News, v 5, n 32, p. 9.*

Daniel Nathan (Deputy Director of CFTC), CFTC Warns the Public About Investment Opportunities Promising Large Profits and Little Risk, Even When Offered by Friends and Acquantices!, Quatloos, htttp://www.quatloos.com/forex_cftc_warns.htm, Jun. 4, 2007.*

Georgi Georgiev, Benefits of Commodity Investment, Mar. 2001, CISDM/School of Management, p. 1-13.*

Joseph H. Golec, The Effects of Incentive Compensation Contract on the Risk and Return Performance of Commody Trading Advisors, Clark University, Graduate School of Management, Nov. 1993, p. 1404-1406.*

The GSCI® Manual, "A Guide to the Goldman Sachs Commodity Index", GSCI Manual—2003 Edition, Goldman Sachs Commodities Research, 2004 Edition, Dec. 2003, 88pgs.

Disclosure Document Supplement: "Commodity Trakrs", Jul. 1, 2002, Copyright © 2002, 2003 Chicago Mercantile Exchange Inc. 48pgs.

John Spence, "Deutsche Bank, Barclays commodity ETFs face off Both funds provide broad exposure, but with different approaches", MarketWatch, Jul. 31, 2006. Http://www.marketwatch.com/news/story/deutsche-bank-barclays-face-off/story.aspx? 2pgs.

Form S-1, Registration Statement for "iShares GSCI® Commodity-Indexed Trust iShares GSCI® Commodity-Indexed Investing Pool LLC". As filed with Securities and Exchange Commission on Jul. 22, 2005. p. 1-73.

* cited by examiner

METHOD AND APPARATUS FOR CREATING AND ADMINISTERING A PUBLICLY TRADED INTEREST IN A COMMODITY POOL

This application is a continuation-in-part of, and claims benefit of, copending U.S. Ser. No. 10/827,940 entitled "Method and Apparatus for Creating and Administering a Publicly Traded Interest in a Commodity Pool" filed on Apr. 20, 2004.

BACKGROUND

A number of innovative new securities products have been introduced over the years. For example, the introduction of a variety of novel types of mutual funds have allowed investors to participate in diversified portfolios of equities, bonds, and other securities. More recently, Exchange Traded Funds ("ETF") have been introduced. Generally, an ETF is a fund that tracks an index, but can be traded in the market like a stock. Investors can trade shares of an ETF like stocks and can use the same strategies in trading ETFs that traditionally have been used with respect to stocks, such as selling short, buying and holding for the long term, etc. Because ETFs are traded on stock exchanges, they can be bought and sold at any time during the day (unlike most mutual funds) and their price may fluctuate from moment to moment, just like any other stock's price. Investors will also need licensed brokers in order transact in purchase them, which means that a commission will usually be charged.

Unfortunately, ETFs have not, to date been structured to allow an investor to invest in commodities or futures. Currently, investors may make pooled investments in commodities by purchasing interests in "commodity pools," which are similar to mutual funds except that they are primarily engaged in investing and trading in futures contracts or options on futures, rather than securities. In some situations, commodity pools have been created in which shares were offered to the public (i.e., shares in the pool were registered under the U.S. Securities Act of 1933). These commodity pools provide desirable benefits to the investors who participate; unfortunately, however, they do not provide a mechanism for shares to be publicly traded. It would be desirable to provide an ability to publicly trade commodities using a listed equity. More particularly, it would be desirable to provide an interest in a commodity pool that is publicly traded and listed on a securities exchange.

DETAILED DESCRIPTION

Figure 1:
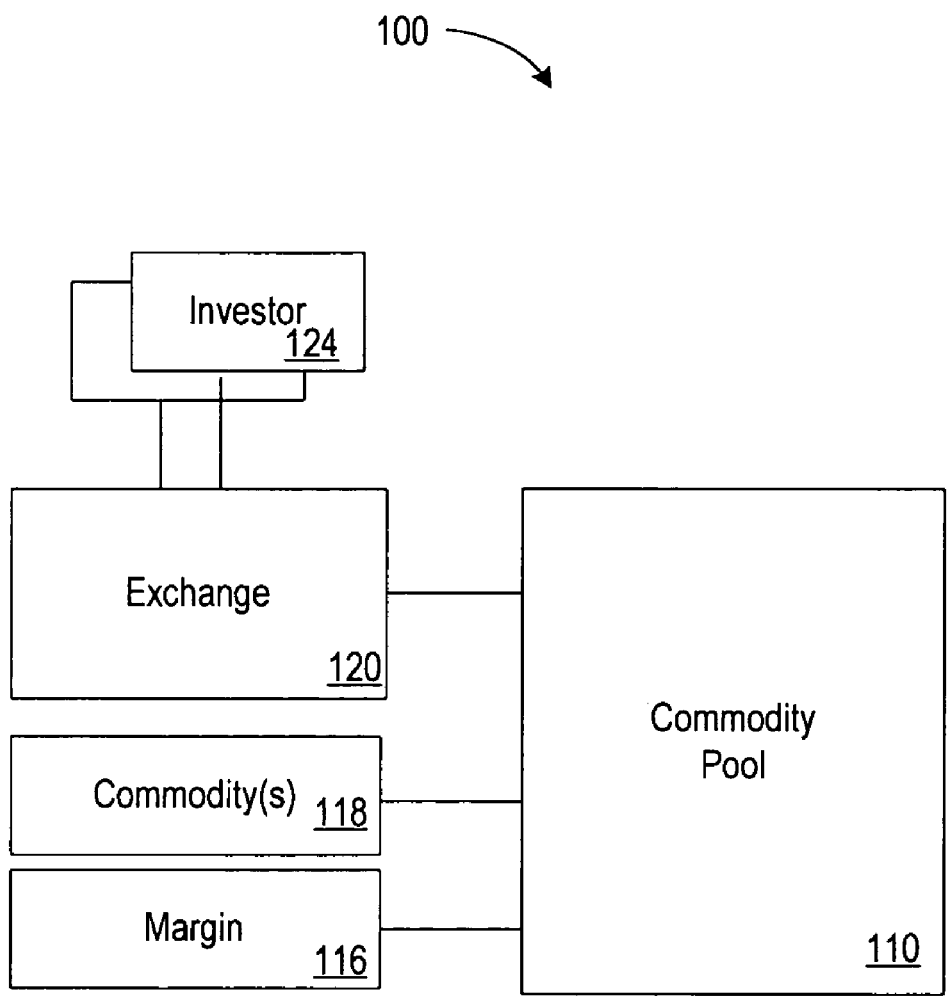
FIG. 1 is a block diagram illustrating components of a commodity pool transaction consistent with some embodiments.

According to some embodiments, systems, methods, apparatus, computer program code, and means are provided for creating and administering a publicly traded interest in a commodity pool. Briefly and by way of introduction, features of some embodiments allow the creation of publicly traded interests in commodity pools. That is, in some embodiments, equity interests associated with a commodity pool may be offered to the public and listed, on a national securities exchange to allow trade in the secondary market.

For the purpose of explaining features of some embodiments, a number of terms are used herein. For example, as used herein, the term "commodity" or "futures contracts" generally refers to a product that trades on a commodity exchange; this would also include futures contracts, and options on futures contracts, on foreign currencies and financial instruments, and indexes of physical commodities. As used herein, the term "commodity" also refers to other financial or non-financial assets that, although not currently the subject of futures traded on commodity exchanges, may be traded on commodity exchanges in the future. In general, for the purpose of creating publicly traded interests in a commodity pool pursuant to embodiments of the present invention, it is preferable that the commodity be one on which there is an active market in related futures contracts. As used herein, the term "futures" or "futures contracts" are used to refer to standardized, transferable, exchange-traded contracts that require delivery of a commodity, commodity (s) or commodity index(es) at a specified price, on a specified future date, or the payment of a cash settlement amount (e.g., against a price index of spot delivery).

As used herein, a "commodity pool" is an entity, typically in the form of a limited partnership, trust, corporation or limited liability company, operated for the purpose of trading commodity futures or option contracts. For example, for embodiments implemented in the United States, a "commodity pool" may be a commodity pool as defined and regulated under the Commodity Exchange Act ("CEA"). Those skilled in the art will appreciate that for embodiments implemented in other jurisdictions, commodity pools may be defined and regulated under other regulatory schemes. In general, attributes of commodity pools and the particular types of pools used herein will be described further below.

Prior to a detailed discussion of some embodiments, a brief illustrative example will now be presented to aid in understanding features of some embodiments of the present invention. This example is not limiting; other implementations are contemplated. In the illustrative example, an entity (such as a financial institution) wishes to establish a publicly traded security in a vehicle the assets of which are linked to the prices of a commodity or group of commodities, thereby allowing investors to buy and sell shares on a public (or national securities) exchange that closely track variations in the prices of the commodities. In the example, the entity chooses to establish a publicly traded security based on the Goldman Sachs Commodity Index®.

The entity causes the formation of a commodity pool. The commodity pool invests in long-dated futures contracts on the Goldman Sachs Commodity Index. In the example, the futures contracts have a maturity of five (5) years and specify a payout at expiration based on the value of the Goldman Sachs Commodity Index. The commodity pool also establishes a position in Treasury securities (or other short term investment) as a margin investment. The margin investment is 100% of the futures investment, and the securities are deposited with the pool's futures commission merchant.

Upon receipt of specified funds from an investor to enable the pool to invest in futures contracts and Treasury securities as described above, the pool issues one or more "creation units" to the investor. A pool may be structured such that each creation unit constitutes, for example, 100,000 publicly traded shares. The initial issue price per share of each creation unit will depend on the number of contracts in the pool and the price of the underlying index at the time of issuance. In the example, assume that the underlying index is at 500 and the long-dated futures contract is at 525 (where each point change in price is $100 per point). In this example, the shares issued in a creation unit pursuant to the present invention will trade at around $52.5 each (calculated as $100/point*100,000*future's price).

In some embodiments, the price per share may also reflect an expense ratio (which may be accrued on a daily basis or in some other manner). The shares in a creation unit are issued for public trade, and may be traded on a national securities exchange. As additional creation units are issued (or as creation unit redemptions occur), the commodity pool increases or decreases the size of its position in the futures contracts and Treasury securities as needed.

Investors may thus publicly-trade shares that closely reflect the price of an underlying commodity or commodity index. Market makers are able to arbitrage this new security against the underlying commodity or index (or related futures contract), thereby ensuring the security is trading close to the asset value. In this manner, a measure of reassurance is provided that the security is trading at (or near) its fair value. Further, the security may be priced intraday, allowing substantial price transparency. Further still, in some embodiments, no physical redemption in kind is needed. In some embodiments, futures positions will be delivered upon redemption. Other features and advantages will be apparent to those skilled in the art.

Features of embodiments will be described by first referring to FIG. 1, where a block diagram depicts portions of a commodity pool transaction 100 consistent with some embodiments. As depicted, commodity pool transaction 100 includes interaction between a number of parties, devices or entities. As shown, the transaction involves a commodity pool 110 formed to establish and hold a commodity position 118 and a corresponding margin position 116. Equity interests in the commodity pool 110 are offered to the public and listed on an exchange 120 allowing trade in the secondary market by a plurality of investors 124.

Pursuant to some embodiments, commodity pool 110 is established with a pool operator. For example, in embodiments implemented subject to U.S. regulatory authority, the pool operator may be a so-called commodity pool operator ("CPO") registered under the CEA. In general, as used herein, a CPO may be an individual or firm that is responsible for the operation of a commodity pool. Pursuant to some embodiments, the CPO refers to a general partner or managing member of a commodity pool established pursuant to the present invention. Further, commodity pool 110 may be advised by an advisor such as a so-called commodity trading advisor ("CTA") registered and regulated under the CEA. In general, both commodity pools 110 are formed to comply with the relevant regulatory authority applicable to commodity pools.

In some embodiments, commodity pool 110 is organized as a limited liability entity such as, for example, a limited partnership. In some embodiments, commodity pool 110 is formed to qualify for pass-through tax treatment. In some embodiments, in addition to the issuance of equity interests to the public, equity interests are also issued to, and are redeemable by, at least one other entity serving as the CPO, general partner or managing member.

Pursuant to some embodiments, in order to track the performance of a commodity, commodities or commodities index, commodity pool 110 is formed to invest solely in commodities future contracts (as well as corresponding margin investments, e.g., in Treasury securities or the like). That is, commodity position 118 may be a position in a single commodity, a number of commodities, or a commodities index. In some embodiments, commodity position 118 is a position in a long-dated futures contract on a commodity index and traded on a designated contract market. For example, in the U.S., the commodity index is traded on a market such as the Chicago Mercantile Exchange, the New York Mercantile Exchange, or the like.

For example, commodity position 118 may be a futures contract having a maturity of approximately five (5) years which provides for a payout at expiration based on the value of the specified index (for example, the Goldman Sachs Commodity Index®, other proprietary index or the like, or a specially created index). The commodity pool's position in the futures contract may be subject to a 100% initial margin requirement. Commodity pool 110 may satisfy this margin requirement by establishing margin position 116. For example, in some embodiments, commodity pool 110 satisfies this margin requirement by purchasing U.S. Treasury securities and depositing the securities with its futures commission merchant. In some embodiments, the margin is pledged to the exchange or clearinghouse. Pursuant to some embodiments, commodity pool 110 is not subject to any subsequent mark-to-market margin requirements.

During the term of the futures contract, commodity pool 110 may increase or decrease the size of its position in the contract, as necessary, to reflect additional investments and redemptions. Pursuant to some embodiments, commodity pool 110 invests in the margin securities (e.g., such as Treasury securities) on a passive basis, does not actively manage the position, and uses the securities solely to margin the futures position.

Pursuant to some embodiments, the pool's futures commission merchant or gent carries the margin securities in an account established for commodity pool 110 and posts its own assets (or utilizes a letter of credit or the like) to margin the futures position at the applicable clearinghouse. The margin securities will be liquidated only if necessary to fund redemptions and additional margin securities will be purchased if there are new investments in commodity pool 110. In some embodiments, interest earned from the collateral is reinvested in the commodity pool and used to buy additional margin securities. In some embodiments, the interest is paid as a periodic dividend to the public pool. Any dividends or reinvestment may be subject first to the payment of expenses.

At expiration of the futures contract, commodity pool 110 will receive any increase in the value of the underlying index and will pay out (out of the 100% margin posted initially) any decrease in such value. At expiration, the margin securities will be liquidated. If commodity position 118 has declined in value, an appropriate portion of the proceeds of the sale of the margin securities will be used to fund the commodity pool's obligations under the futures contract and the remainder will be distributed to investors 124.

In some embodiments, equity interests of commodity pool 110 are adapted to be publicly traded, e.g., on a national securities exchange. In some embodiments subject to U.S. regulatory authority, equity interests of commodity pool 110 may be registered under the Securities Act of 1933 on Form S-1. In some embodiments, equity interests of public pool 114 are offered publicly to investors 124 on a continuous basis in large "creation unit" aggregations and are listed on a national securities exchange. The equity interests may be traded in the secondary market on an individual, non-aggregated basis. The price of the individual equity interests or shares may be priced intraday, allowing substantial price transparency to investors and the market. In this manner, the shares issued by the commodity pool 110 are traded with a spread near the net asset value of the pool (e.g., after expenses). In some embodiments, the share price may also reflect an expense ratio built into the price (e.g., which may be accrued on a daily basis or the like).

Figure 2:
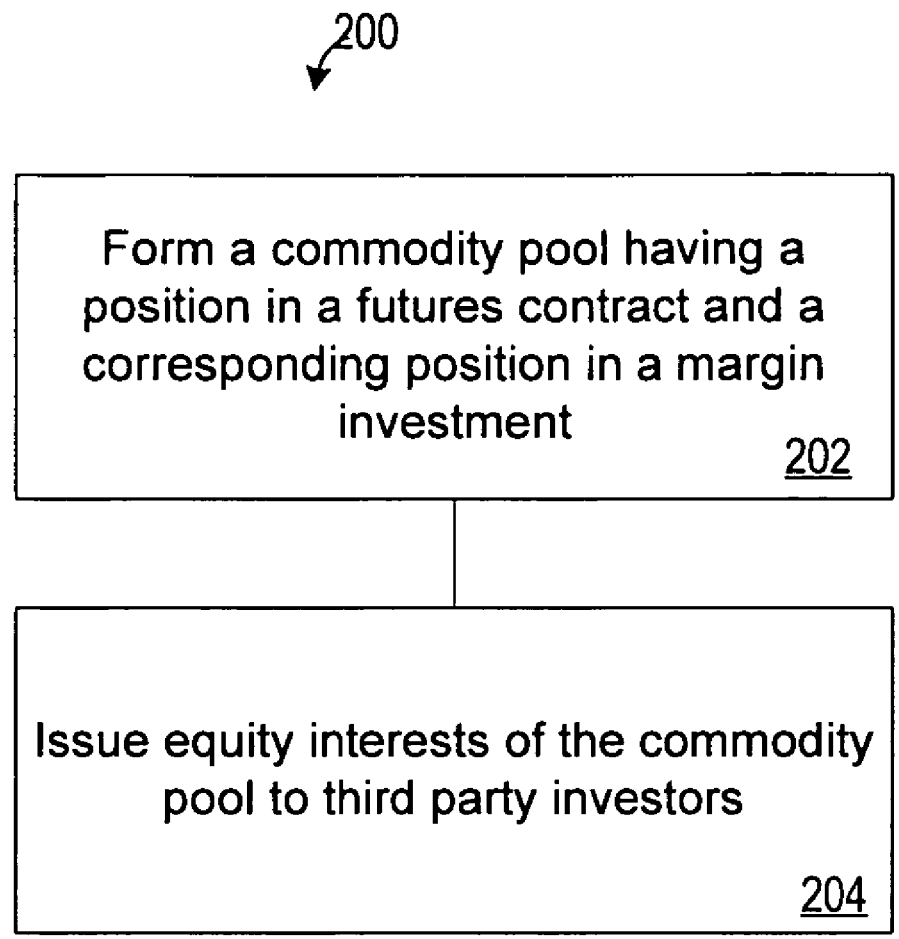
FIG. 2 is a flow diagram illustrating an exemplary process for creating a publicly traded interest in a commodity pool consistent with some embodiments.

Referring now to FIG. 2, a transaction process 200 pursuant to some embodiments will be described. As shown, process 200 begins at 202 with the formation of a commodity pool having a first position in a futures contract and a corresponding second position in a margin investment. Processing continues at 204 where equity interests of the commodity pool are issued to third party investors. Some or all of the portions of transaction process 200 may be performed using, or aided by, computing devices. For example, the issuance of equity interests to the public may include operation of computing device to perform share pricing and other calculations.

Figure 3:
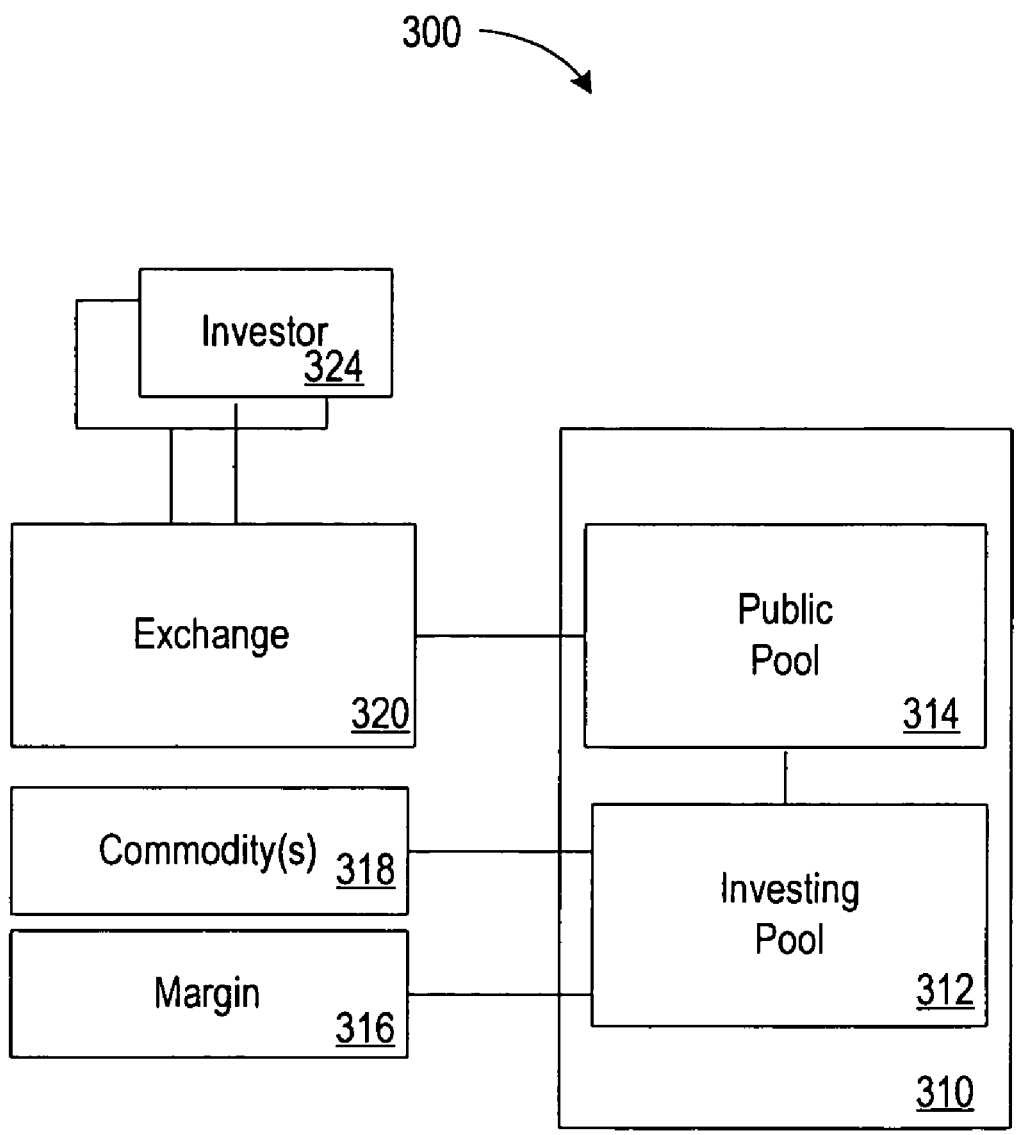
FIG. 3 is a block diagram illustrating components of a further commodity pool transaction consistent with some embodiments.

A further embodiment of a commodity pool transaction 300 will now be described by referring to FIG. 3. As depicted, commodity pool transaction 300 includes interaction between a number of parties, devices or entities. As shown, the transaction involves a commodity pool 310 having two tiers of pools: an investing pool 312 and a public pool 314. Pursuant to some embodiments, the "investing pool" is a commodity pool established to invest in commodity futures contracts and corresponding margin investments. The "public pool" is a commodity pool established to invest in equity interests of the investing pool. Equity interests of the public pool are offered (as will be described further below) to the public. As mentioned above, pursuant to some embodiments, investing pools and public pools established pursuant to the present invention are formed in compliance with relevant regulatory authorities. For example, pools established in, or subject to, U.S. regulatory authority, may be established in compliance with the U.S. CEA.

As shown, investing pool 312 is formed to establish and hold a commodity position 318 and a corresponding margin position 316. Public pool 314 is formed to invest in the equity interests of investing pool 312. Equity interests of public pool 314 are offered to the public and listed on an exchange 320 allowing trade in the secondary market by a plurality of investors 324.

Pursuant to some embodiments, both investing pool 312 and public pool 314 are established with a pool operator. For example, in embodiments implemented subject to U.S. regulatory authority, the pool operator may be a so-called commodity pool operator ("CPO") registered under the CEA. In general, as used herein, a CPO may be an individual or firm that is responsible for the operation of a commodity pool. Pursuant to some embodiments, the CPO refers to a general partner or managing member of a commodity pool established pursuant to the present invention. Further, both investing pool 312 and public pool 314 may be advised by an advisor such as a so-called commodity trading advisor ("CTA") registered and regulated under the CEA. In general, both investing pool 312 and public pool 314 are formed to comply with the relevant regulatory authority applicable to commodity pools.

In some embodiments, investing pool 312 is organized as a limited liability entity such as, for example, a limited partnership. In some embodiments, investing pool 312 is formed to qualify for pass-through tax treatment. Equity interests of investing pool 312 are issued to, and are redeemable by, public pool 314. In some embodiments, equity interests are also issued to, and are redeemable by, at least one other entity serving as the CPO, general partner or managing member. In some embodiments, the CPO may invest in some material percentage of the original issuance of shares as a general partner.

Similar to the embodiment discussed in conjunction with FIGS. 1 and 2 above, in order to track the performance of a commodity, commodities or commodities index, investing pool 312 is formed to invest solely in commodities future contracts (as well as corresponding margin positions). That is, commodity position 318 may be a position in a single commodity, a number of commodities, or a commodities index. In some embodiments, commodity position 318 is a position in a long-dated futures contract on a commodity index and traded on a designated contract market. For example, in the U.S., the commodity index is traded on a market such as the Chicago Mercantile Exchange, the New York Mercantile Exchange, or the like.

For example, commodity position 318 may be a futures contract having a maturity of approximately five (5) years which provides for a payout at expiration based on the value of the specified index (for example, the Goldman Sachs Commodity Index®, other proprietary index or the like, or a specially created index). The investing pool's position in the futures contract may be subject to a 100% initial margin requirement. Investing pool 312 may satisfy this margin requirement by establishing margin position 316. For example, in some embodiments, investing pool 312 satisfies this margin requirement by purchasing U.S. Treasury securities and depositing the securities with its futures commission merchant or similar agent. Pursuant to some embodiments, investing pool 312 is not subject to any subsequent mark-to-market margin requirements.

During the term of the futures contract, investing pool 312 may increase or decrease the size of its position in the contract, as necessary, to reflect additional investments and redemptions (as received through public pool 314 as discussed below). Pursuant to some embodiments, investing pool 312 invests in the margin securities (e.g., such as Treasury securities) on a passive basis, does not actively manage the position, and uses the securities solely to margin the futures position.

Pursuant to some embodiments, the pool's futures commission merchant carries the margin securities in an account established for investing pool 312 and posts its own assets (or utilizes a letter of credit or the like) to margin the futures position at the applicable clearinghouse. The margin securities will be liquidated only if necessary to fund redemptions and additional margin securities will be purchased if there are new investments in investing pool 312.

At expiration of the futures contract (unless it is rolled as discussed below), investing pool 312 will receive any increase in the value of the underlying index and will pay out (out of the 100% margin posted initially) any decrease in such value. At expiration, the margin securities will be liquidated. If commodity position 318 has declined in value, an appropriate portion of the proceeds of the sale of the margin securities will be used to find the investing pool's obligations under the futures contract and the remainder will be distributed to public pool 314 and then to investors 324.

In some embodiments, public pool 314 is formed as a trust to invest solely in the equity securities of investing pool 312. Equity interests of public pool 314 are adapted to be publicly traded, e.g., on a national securities exchange. In embodiments subject to U.S. regulatory authority, equity interests of public pool 314 are registered under the Securities Act of 1933 on Form S-1. In some embodiments, equity interests of investing pool 312 may also be registered in a similar manner. Equity interests of public pool 314 are offered publicly to investors 324 on a continuous basis in large "creation unit" aggregations and are listed on a national securities exchange. The equity interests may be traded in the secondary market on an individual, non-aggregated basis.

Pursuant to some embodiments, creation and redemption of interests in public pool 314, and the corresponding creation and redemption of interests in investing pool 312, will generally be effected through transactions in "exchanges of futures for physicals", or "EFPs". As used herein, an EFP is an exchange of futures for physicals that involves generally contemporaneous transactions in futures contracts and the underlying cash commodity or a closely related commodity.

In a typical EFP, the buyer of the futures contract sells the underlying commodity to the seller of the futures contract in exchange for a cash payment reflecting the value of the commodity and the relationship between the price of the commodity and the related futures contract.

In the context of CERFs (long positions in future contracts on the GSCI® Excess Return Index" listed on the Chicago Mercantile Exchange, CME), CME rules permit the execution of EFPs consisting of simultaneous purchases (sales) of CERFs and sales (purchases) of shares. This mechanism will generally be used by the commodity pool (or trust) in connection with the creation and redemption of Baskets (i.e., blocks of shares. e.g., a block of 500 shares). Specifically, it is anticipated that an Authorized Participant requesting the creation of additional Baskets typically will transfer CERFs and cash (or, in the discretion of the Trustee, short-term securities in lieu of cash) to the trust in return for shares.

The commodity pool or trust will simultaneously contribute to the investing pool the CERFs (and any cash or securities) received from the Authorized Participant in return for the issuance of additional interests in the investing pool. If an EFP is executed in connection with the redemption of one or more Baskets, the Authorized Participant will transfer to the commodity pool or trust the interests being redeemed and the commodity pool or trust will transfer to the Authorized Participant CERFs, cash or short-term securities. In order to obtain the CERFs, cash or short-term securities to be transferred to the Authorized Participant, the commodity pool or trust will redeem an equivalent portion of its interest in the investing pool.

Figure 4:
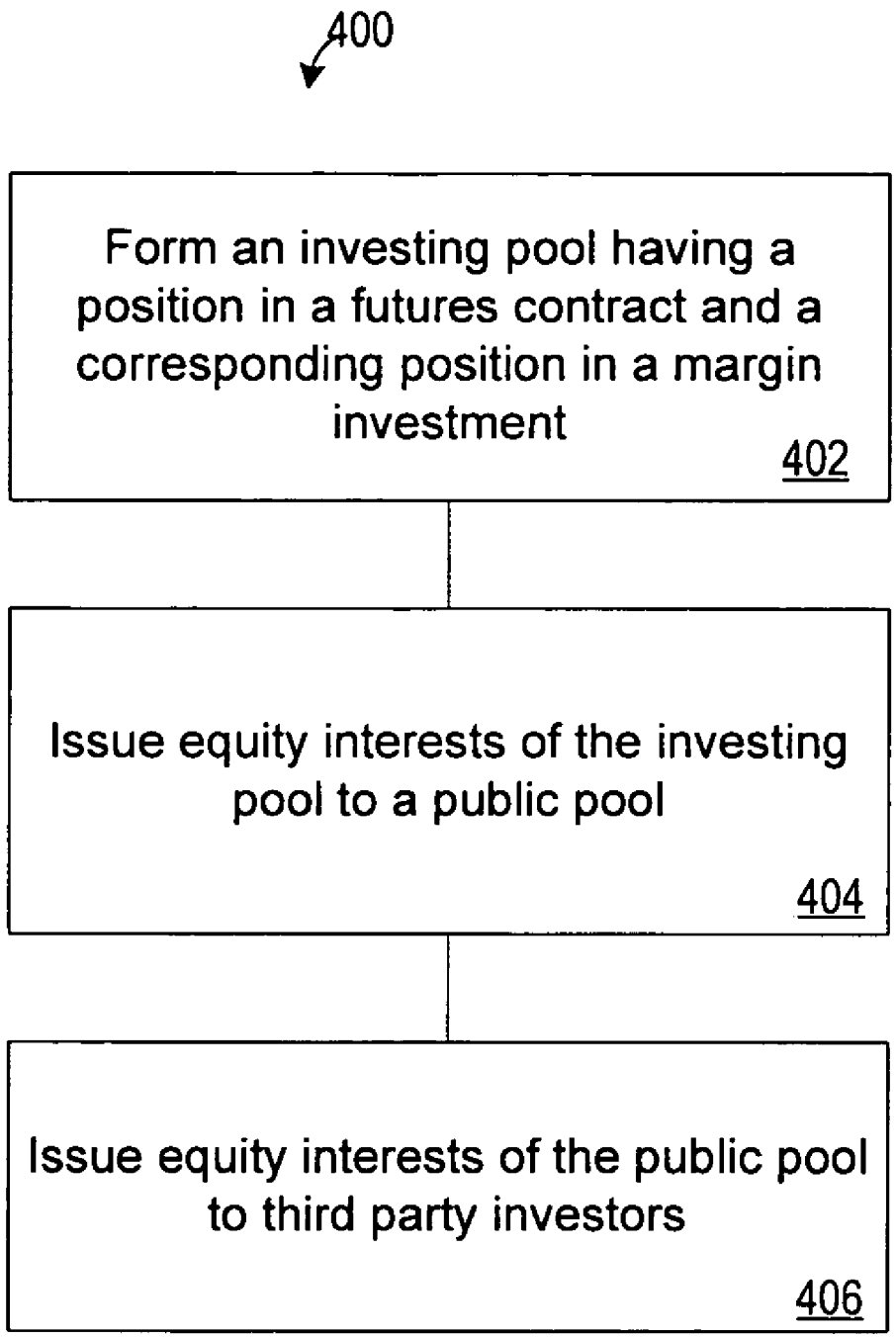
FIG. 4 is a flow diagram illustrating an exemplary process for creating a publicly traded interest in a commodity pool consistent with some embodiments.

A further transaction process 400 pursuant to some embodiments will now be described by reference to FIG. 4. As shown, process 400 begins at 402 with the formation of an investing pool having a first position in a futures contract and a corresponding second position in a margin investment. Processing continues at 404 where equity interests of the investing pool are issued to a public pool. Processing continues at 406 where equity interests of the public pool are issued to third party investors.

As discussed above, some or all of process 400 may involve the use of computing devices. For example, the issuance of equity interests may include the use of computing devices configured to perform pricing and other share calculations. Further, the issuance of equity interests and trade thereof may involve the use of computing devices to perform or facilitate trade of the securities. Similarly, any of the participants (such as the investors, the issuer, the exchange, the commodity pool, etc.) may utilize one or more computing devices to evaluate, price, administer, or manage shares issued pursuant to embodiments described herein.

Figure 5:
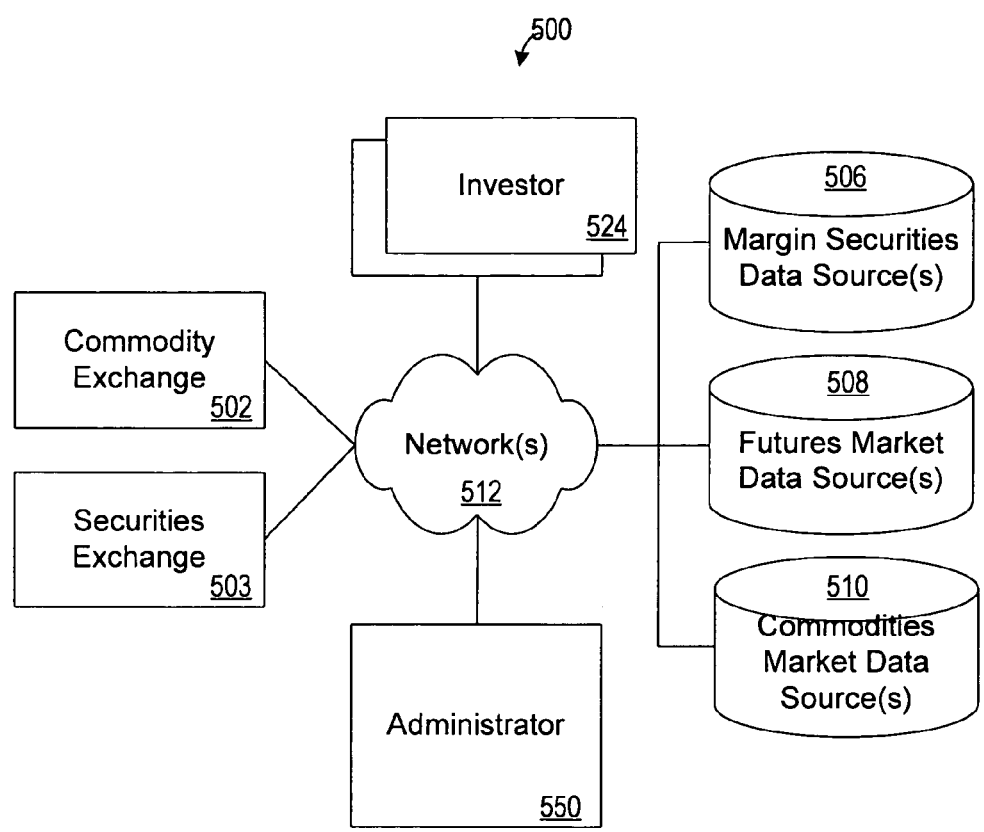
FIG. 5 is a block diagram of a system pursuant to some embodiments.

Referring now to FIG. 5, a system 500 is shown for trading shares issued pursuant to the present invention (generally referred to herein as "commodity shares"). That is, system 500 is an embodiment of a system which allows a plurality of investors 524 to buy and sell commodity shares issued by a commodity pool as described herein. As shown, system 500 includes a number of participants, some or all of which are in communication over one or more communications networks 512 (such as, for example, the Internet, wired or wireless telephone networks, or the like).

System 500 also includes one or more commodity exchanges 502 (e.g., such as the Chicago Mercantile Exchange, or the like) and one or more national securities exchanges 503 (e.g., such as the American Stock Exchange, or the like). For example, in some embodiments, commodities exchange 502 may be the Chicago Mercantile Exchange, on which the underlying commodities and futures contracts trade, and the securities exchange 503 may be the American Stock Exchange, on which the publicly traded interest of the present invention trades.

In general, exchange 502 operates to provide a market for commodities and exchange 503 provides a market for the commodity shares issued pursuant to the present invention. For example, commodities exchange 502 allows investors 524 to buy or sell commodity shares from or to other investors 524. Commodities exchange 502 also provides clearing and settlement functions to ensure that trades involving commodity shares are completed. Securities exchange 503 supports the trade of publicly traded interests created pursuant to the present invention. Exchange 503 may list and support trade in a number of different commodity shares. For example, each commodity share may be designated by a separate symbol allowing ready identification of orders and prices associated with the commodity share. Other functions commonly provided by exchanges and known in the art may also be provided to support trading of commodity shares pursuant to the present invention.

Each commodity share traded on securities exchange 503 may be associated with an administrator device 550. Administrator device 550 may be, for example, operated by or on behalf of, a commodity pool operator as described above. In general, administrator device 550 is configured to perform pricing of commodity shares and perform administrative functions associated with the issuance of commodity shares.

Each of these functions may be performed using data received from a number of data sources, including margin securities data sources(s) 506, futures market data source(s) 508 and commodities market data source(s) 510.

For example, to perform pricing of a commodity share, administrator device 550 may receive data from commodities market data source(s) 510 indicating commodities price information. This price information may be received intraday in substantially real time or on a periodic basis (e.g., such as daily). For a commodity share based on an underlying index (e.g., such as the Goldman Sachs Commodity Index® or "GSCI®"), a number of different commodity prices may be received in order to calculate a price of the underlying index. For example, the value of the index may be calculated as the total dollar weight of the index divided by a normalizing constant. Daily contract reference prices may also be used in this calculation in order to establish a transparent index price. Other commodity or commodity index pricing techniques will be apparent to those skilled in the art.

Administrator device 550 also receives input information regarding futures contract prices from one or more futures market data source(s) 508 (e.g., such as from one or more futures exchanges such as exchange 502). This information is used in conjunction with the commodity price information described above to calculate a net asset value of the commodity pool associated with the commodity share. A price of each share is then calculated based on the net asset value of the pool and the number of commodity shares issued from the pool. This information may be communicated to securities exchange 503 and/or investors 524 to provide commodity share price information. In some embodiments, this price information may be calculated by securities exchange 503 or other entities.

Administrator device 550 may also operate to perform pool administration functions. For example, as discussed above, in some embodiments, a commodity share is issued from a commodity pool holding a first position in a long-dated futures contract and a second position in a margin security, such as U.S. Treasury securities. Administrator device 550 may be configured to manage rebuys or rolls of these positions. For example, at or near expiration of a long-dated futures contract, administrator device 550 may facilitate or support the rebuy of a new futures contract prior to expiration. Similarly, administrator device 550 may facilitate or support the purchase of new margin securities as needed. Administrator device 550 may facilitate or support any mark to market requirements that arise. Further, device 55O may calculate and track any fees or expenses associated with the administration of each commodity share and reflect this in the commodity share price.

Figure 6:
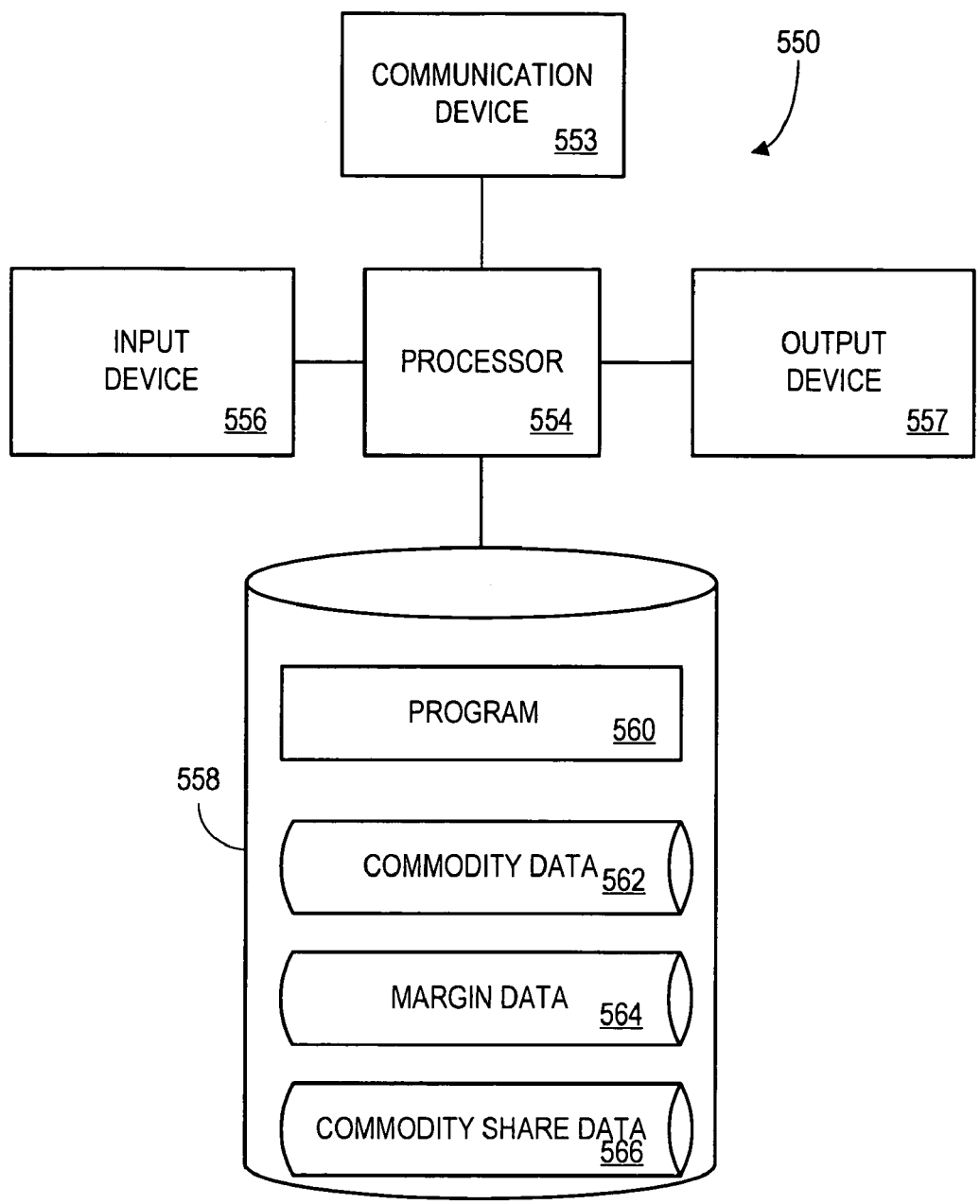
FIG. 6 is a block diagram of an administrator device pursuant to some embodiments.

Some or all of the components of system 500 may be configured as computing devices. For example, referring now to FIG. 6, a computing device is shown for use as administrator device 550. In some embodiments, administrator device 550 is operated by one or more administrators acting to assist in, or direct the issuance of shares pursuant to embodiments disclosed herein. For example, in some embodiments, administrator device 550 is operated by, or on behalf of, an issuer to price and identify terms associated with the issuance of shares, to monitor share redemptions, to perform intraday or other pricing, or the like.

As depicted, administrator device 550 includes a computer processor 554 operatively coupled to a communication device 552, a storage device 558, an input device 556 and an output device 557. Communication device 552 may be used to facilitate communication with, for example, other devices and other participants (such as, for example, devices operated by investors, issuers, agents, market data providers, etc.) Input device 556 may comprise, for example, one or more devices used to input data and information, such as, for example: a keyboard, a keypad, a mouse or other pointing device, a microphone, knob or a switch, an infra-red (IR) port, etc.

Output device 557 may comprise, for example, one or more devices used to output data and information, such as, for example: an IR port, a docking station, a display, a speaker, and/or a printer, etc.

Storage device 558 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

Storage device 558 stores one or more programs 560 or rule sets for controlling processor 554. Processor 558 performs instructions of program 560, and thereby operates in accordance with aspects of the present invention. In some embodiments, program 560 includes pricing rules used to evaluate or select terms associated with commodity shares issued pursuant to embodiments described herein. In some embodiments, program 550 includes rules used to identify the occurrence of events associated with commodity shares issued pursuant to the present invention (and to perform administration tasks relating to the occurrence of the events). For example, rules may be established to perform intraday pricing of shares. As another example, rules may be established to calculate expense ratios or other fees associated with the issuance of shares pursuant to the present invention. As yet another example, rules may be established to facilitate rebuys or rolls of futures contracts and margin securities. In some embodiments, program 550 may be configured as a neural-network or other type of program using techniques known to those skilled in the art to achieve the functionality described herein.

Storage device 558 also stores one or more databases, including, for example, commodity data 552, margin data 554, share data 556, etc. For example, this information may be retrieved from third party data sources as shown in FIG. 5. This information may be used, for example, to issue and/or administer commodity shares as described above in conjunction with FIG. 5 (or in other manners which will become apparent to those skilled in the art.).

Features of some embodiments will now be described by reference to several illustrative transactions and by reference to FIGS. 7-11. The following examples are for illustrative purposes only. To aid in discussion of the illustrative transactions, several further terms will be defined. In particular, as used in the following examples, a "commodity ETF share" is defined as an equity share in the trust 314 where the return is based on the Goldman Sachs ("GS") West Texas Intermediate crude ("WTI") Excess Return Index "GS WTI-ER". The Commodity ETF shares in the trust 314 are listed on an equity exchange.

As used in the following examples, a "commodity excess return future" ("CERF") is defined as a long dated future contract listed on the NYMEX based on the GS WTI Excess Return Index. The contract, for the purposes of this example, have a maturity of approximately five years and will provide for a payout at expiration based on the value of the GS WTI Excess Return Index. For purposes of this example, one CERF shall correspond to, and will be exchanged for, (via an Exchange for Physical) 1000 Commodity ETF Shares on the redemption and creation of shares. For purposes of this example, the CERF Index multiplier shall be $100 per point. The notional value of one CERF shall equal $100 multiplied by the CERF Price in points. For example, if the CERF is trading at $1000 then the notional value of each CERF would be $100,000 and the commodity ETF share would be worth approximately $100.

As used in this example, a "market participant" ("MP") is defined as anybody licensed to trade on one or more equity exchanges. Further, an "authorized market participant" ("AMP") is defined as a MP that is authorized to redeem or create shares. AMPs are MPs selected from firms that are "futures commission merchants" ("FCMs"). A floor specialist "FS" is a MP on the stock exchange.

Figure 7:
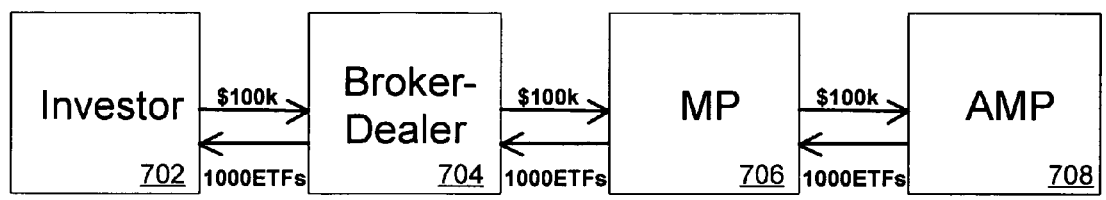
FIG. 7 is a block diagram of a transaction involving an investor buying a commodity ETF share pursuant to some embodiments.

Reference is now made to FIG. 7, where an illustrative transaction involving an investor buying a commodity ETF share is shown pursuant to some embodiments. An investor 702 places an order to buy 1000 commodity ETF shares though a broker-dealer 704 for $100 per share which equates to $100,000 notional of the commodity ETF shares. Next, the broker-dealer 704 executes the investor's order 702 by buying 1000 commodity ETF shares via a MP 706 (which may be, for example, a floor specialist).

The investor 702 now owes the broker-dealer 704 $100,000 and will receive 1000 commodity ETF shares at settlement. At the end of this transaction, the broker-dealer 704 is flat since at settlement, the broker-dealer 704 will pass through the $100,000 and the shares between the MP 706 and the investor 702. The MP 706 is now short 1000 commodity ETF shares, has share price risk, and needs to hedge. For this example it will be assumed that the MP 706 buys the shares from an AMP 708 at prevailing market price and that the AMP 708 has no commodity ETF shares in inventory (the MP 706 might have also bought shares from another MP). The AMP 708 now needs to hedge the 1000 commodity ETF shares it sold as well as borrow or create shares to make delivery.

If for example, the AMP 708 had the shares in inventory, the AMP 708 could have hedged that exposure by having a corresponding short position in the futures market to offset its long commodity ETF share position. Therefore, if the AMP 708 had used shares from inventory, it would then have had to buy back its futures short to unwind its inventory hedge once the shares are taken out of inventory.

Figure 8:
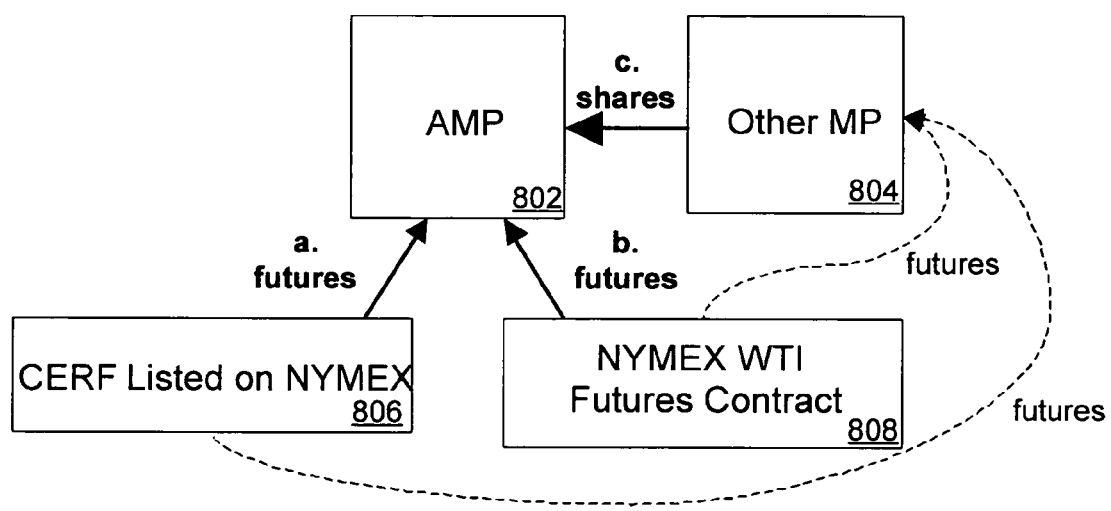
FIG. 8 is a block diagram of a transaction of an AMP hedging the commodity price risk pursuant to some embodiments.

Referring now to FIG. 8, for purposes of illustration only, a transaction of an AMP hedging the commodity price risk is described. In general, pursuant to some embodiments, an AMP 802 that desires to hedge commodity price risk in a transaction, such as the transaction described in conjunction with FIG. 7, has three options.

The first option is to buy one GS WTI CERF listed on the NYMEX 806 (or other suitable exchange). Each CERF 806 is equivalent to a fixed number of commodity ETF Shares. For this example, 1000 commodity ETF shares equals one CERF 806. The AMP 802 is now long commodity futures in order to hedge its obligation to deliver 1000 commodity ETF shares.

The second option is for the AMP 802 to buy the underlying commodity future to replicate $100,000 notional GS WTI Excess Return Index. In this example the commodity future is the NYMEX WTI futures contract 808. The AMP 802 is now long commodity futures in order to hedge its obligation to deliver 1000 commodity ETF shares. Those skilled in the art will appreciate that this option may only be viable for hedging purposes and that only CERFs can be used for creation/redemption.

The third option is for the AMP 802 to buy 1000 commodity ETF shares from another MP 804 where the seller of shares will then need to hedge in futures market using either CERFs listed on NYMEX 806 or NYMEX futures contracts 808. If the AMP 802 had the shares in inventory, the AMP 802 would have had to buy back its futures short (that is, hedge using the first two options described above) to unwind its inventory hedge as the shares are taken out of inventory.

Figure 9:
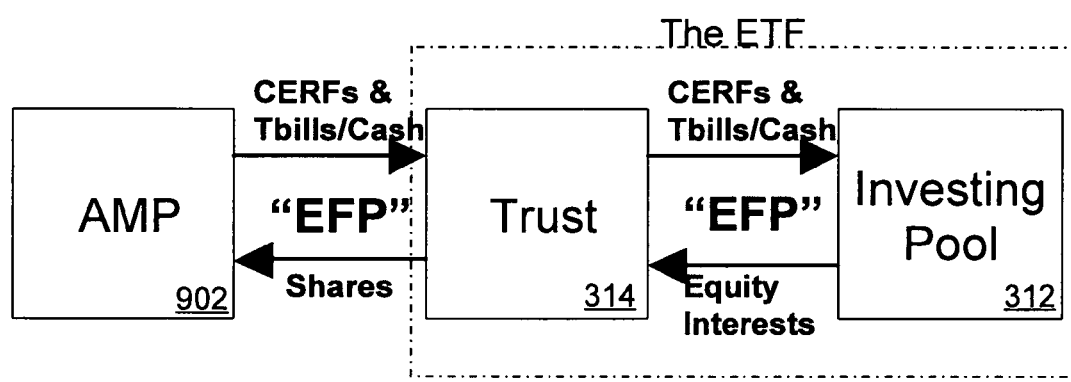
FIG. 9 is a block diagram of a transaction of an AMP creating shares pursuant to some embodiments.

Referring now to FIG. 9, for purposes of illustrating features of some embodiments, a transaction of an AMP creating shares is described. Assume, for the example, that numerous trades had taken place and the AMP 902 has built a short position of at least 100,000 shares where 100,000 shares are the minimum size required to create or redeem. The AMP's 902 risk is hedged in the futures market as shown in FIG. 8 and the AMP 902 can now choose to create additional shares.

The AMP 902 can create shares by executing an EFP with the trust 314. The AMP 902 creates no commodity risk via the creation process because the shares are hedged in the futures market. The AMP 902 transfers 100 CERFs and corresponding T-Bills (or cash, etc.) to trust 314 via an EFP. The trust 314 then issues 100,000 commodity ETF shares 310 (assuming that the commodity ETF share 310 is still worth $100 per share) to the AMP 902. This transfer of CERFs for shares will occur at the settlement price of the CERF and corresponding formulaic share price. The AMP 902 now has no position in CERFs or commodity ETF shares but the AMP has shares to deliver against settlement or shares borrowed and no longer has the futures hedging position.

The share price, and therefore the corresponding amount of CERFs and cash to be delivered, is formulaically linked to the GS WTI-ER index price plus or minus a fair value adjustment. For this example the value adjustment will be the collateral returns less costs such as but not limited to administrative, management and licensing fees. This adjustment is done at the end of day net asset value ("NAV") on any trading day.)

The trust 314 transfers the CERFs and T-Bills/cash via an EFP to the investing pool 312. The investing pool 312 holds the CERFs and T-Bills/cash and issues equity interests to the trust 314. The trust 314 in this example stands between the market and the investing pool 312 to simplify tax reporting. As a result of this transaction, the AMP 902 now has no future or share exposure. The trust 314 creates shares that are hedged via the equity interests in the trust 314 while the investing pool 312 is short equity interests to the trust 314 and long futures and T-bills.

Figure 10:
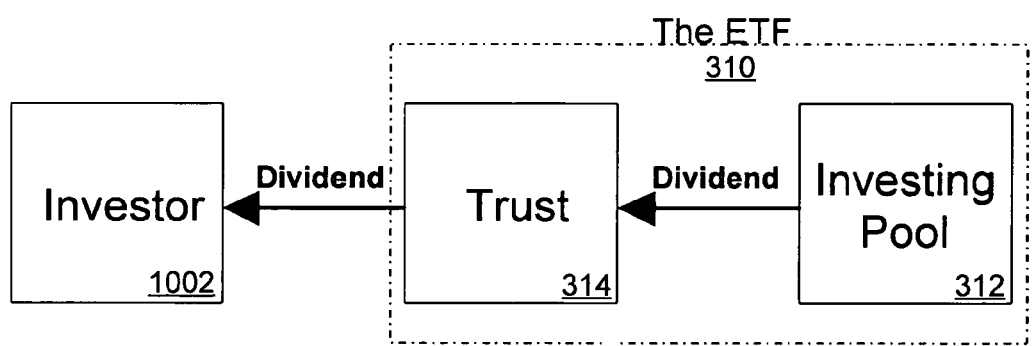
FIG. 10 is a block diagram of a transaction involving the issuance of dividend payments pursuant to some embodiments.

Referring now to FIG. 10, for purposes of illustrating features pursuant to some embodiments, a transaction of involving the issuance of dividend payments from trust 314 is described. The investing pool 312 holds the CERFs and T-Bills and the T-Bills are used to fully margin the CERF position. A dividend is delivered to investor 1002 via the trust 314 which it receives from the investing pool 312 on a periodic basis. The dividend is created to the extent the interest on the collateral exceeds fees such as but not limited to the management, administrative and license fees.

Figure 11:
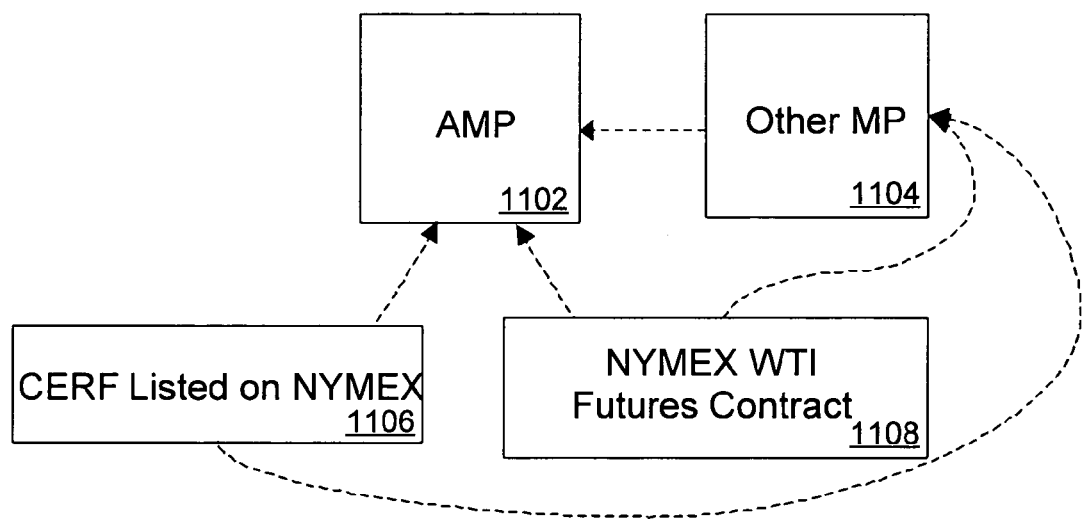
FIG. 11 is a block diagram of ongoing CERF trading pursuant to some embodiments.

Referring now to FIG. 11, for purposes of illustrating features of some embodiments, ongoing CERF trading is described. FIG. 11 shows the flow of ongoing CERF 1106 trading by individuals such as but not limited to, commodity dealers, NYMEX locals and speculators that are initially short CERFs to the AMP 1102 and ultimately to the investing pool 312. Participants who sell CERFs 1106 are implicitly short the GS WTI Excess Return Index plus an imbedded roll cost risk premium. Participants can hedge commodity price risk of their CERF 1106 short position via NYMEX WTI futures 1108.

The GS WTI Excess Return Index for this example assumes a rolling nearby futures exposure. Therefore, buying NYMEX WTI futures 1108 will hedge participants' current price risk, but they will have to actively manage the actual monthly roll (and associated costs) versus the imbedded premium in the CERF until maturity.

Although the present invention has been described with respect to a preferred embodiment thereof, those skilled in the art will note that various substitutions may be made to those embodiments described herein without departing from the spirit and scope of the present invention. With these and other advantages and features of the invention that will become hereinafter apparent, the nature of the invention may be more clearly understood by reference to the above detailed description of the invention, the appended claims and to the several drawings attached herein.

What is claimed is:

1. A method for creating a publicly traded interest in a commodity pool, comprising:
    forming a commodity pool having a public pool, an investing pool, a first position in a futures contract, and a second position in a margin investment, said investing pool holding said first and said second position;
    issuing equity interests of said investing pool to said public pool;
    issuing equity interests of said commodity pool to investors, said equity interests of said commodity pool issued to investors are equity interests of said public pool and are adapted for trade on an exchange; and
    periodically calculating a dividend earned by said commodity pool, said dividend is a dividend earned by said investing pool.

2. The method of claim 1, wherein said dividend is paid to said public pool.

3. The method of claim 1, wherein said dividend is used to increase said investing pools position in said futures contract.

4. The method of claim 1, wherein said dividend is earned from said second position in said margin investment.

5. The method of claim 1, wherein said second position is selected to margin said first position.

6. The method of claim 1, wherein said futures contract is a long-dated futures contract.

7. The method of claim 1, wherein said futures contract is a contract on a commodity index and traded on a designated contract market.

8. The method of claim 1, wherein said issuing said equity interests further comprises aggregating said equity interests into creation units and issuing said creation units as shares for trade on an exchange.

9. A system, comprising:
    a processor; and
    a storage device in communication with said processor and storing instructions adapted to be executed by said processor to:
        form a commodity pool having a public pool, an investing pool, a first position in a futures contract and a second position in a margin investment, said investing pool holding said first and said second position;
        issue equity interests of said investing pool to said public pool;
        issue equity interests of said commodity pool to investors, said equity interests of said commodity pool issued to investors are equity interests of said public pool and are adapted for trade on an exchange; and
        periodically calculate a dividend earned by said commodity pool, said dividend is a dividend earned by said investing pool.

10. A medium storing instructions adapted to be executed by a processor to perform a method for creating publicly traded interests in a commodity pool, said medium comprising:
    instructions for forming a commodity pool having a public pool, an investing pool, a first position in a futures contract and a second position in a margin investment, said investing pool holding said first and said second position;
    instructions for issuing equity interests of said investing pool to said public pool;
    instructions for issuing equity interests of said commodity pool to investors, said equity interests of said commodity pool issued to investors are equity interests of said public pool and are adapted for trade on an exchange; and
    instructions for periodically calculating a dividend earned by said commodity pool, said dividend is a dividend earned by said investing pool.

11. The medium of claim 10, further comprising:
    instructions for pricing said equity interests of said commodity pool issued to investors on a regular basis based on price information associated with said futures contract and said margin investment.

12. The medium of claim 10, further comprising:
    instructions for causing said pricing to be disseminated to an exchange.

* * * * *